United States Patent
Hind et al.

(10) Patent No.: US 7,305,402 B2
(45) Date of Patent: Dec. 4, 2007

(54) ADAPTIVE INDEXING TECHNIQUE FOR USE WITH ELECTRONIC OBJECTS

(75) Inventors: John R. Hind, Raleigh, NC (US); Hiroyuki Miyamoto, Lexington, MA (US); Abdolreza Salahshour, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 09/973,883

(22) Filed: Oct. 10, 2001

(65) Prior Publication Data

US 2003/0069900 A1 Apr. 10, 2003

(51) Int. Cl.
*G06F 17/00* (2006.01)

(52) U.S. Cl. .................. 707/101; 707/102; 707/103 R; 707/104.1

(58) Field of Classification Search .............. 707/1–10, 707/100–104.1, 200–206; 715/515, 501.1–510, 715/526–529, 530–541, 513, 514
See application file for complete search history.

(56) References Cited

U.S. PATENT DOCUMENTS

| | | | | |
|---|---|---|---|---|
| 5,530,861 A | 6/1996 | Diamant et al. | ............... | 705/9 |
| 5,802,253 A | 9/1998 | Gross et al. | ................... | 706/47 |
| 5,832,470 A | 11/1998 | Morita et al. | ................... | 707/1 |
| 5,864,870 A | 1/1999 | Guck | ......................... | 707/104 |
| 6,029,164 A | 2/2000 | Birrell et al. | ................... | 707/3 |
| 6,055,540 A * | 4/2000 | Snow et al. | ............ | 707/103 R |
| 6,057,841 A | 5/2000 | Thurlow et al. | ............. | 345/347 |
| 6,070,176 A * | 5/2000 | Downs et al. | ............... | 715/513 |
| 6,073,137 A | 6/2000 | Brown et al. | ................ | 707/104 |
| 6,088,696 A | 7/2000 | Moon et al. | ................... | 707/10 |
| 6,098,066 A * | 8/2000 | Snow et al. | .................... | 707/3 |
| 6,147,687 A | 11/2000 | Wanderski | | |
| 6,161,113 A * | 12/2000 | Mora et al. | ................. | 715/505 |
| 6,161,130 A * | 12/2000 | Horvitz et al. | ................. | 707/5 |
| 6,613,100 B2 * | 9/2003 | Miller | ........................ | 715/526 |
| 6,636,250 B1 | 10/2003 | Gasser | | |
| 6,662,178 B2 * | 12/2003 | Lee | ............... | 707/3 |
| 6,792,430 B1 * | 9/2004 | Kenyon et al. | ............. | 707/102 |
| 6,868,525 B1 | 3/2005 | Szabo | | |
| 2003/0105765 A1* | 6/2003 | Smith et al. | ................. | 707/100 |

FOREIGN PATENT DOCUMENTS

JP 10262076 9/1998
WO 9322738 3/1993

OTHER PUBLICATIONS

IBM Technical Disclosure Bulletin, "Use of Pre-processing for Electronic Mail In Baskets", n1h 06-92, pp. 395-396.
IBM Technical Disclosure Bulletin, "Cancel a Folder Document Only From the Inbasket" n5 10-91, pp. 76-77.

(Continued)

*Primary Examiner*—Isaac Woo
(74) *Attorney, Agent, or Firm*—Marcia L. Doubet; Andre M. Gibbs

(57) ABSTRACT

Methods, systems, and computer program products for organizing and viewing electronic objects (such as incoming electronic mail messages, documents, and so forth) according to relationships among the objects. Objects may be organized according to user-selectable, node-specific criteria. These criteria may be dynamically learned, based upon a particular user's behavior, using the disclosed techniques.

18 Claims, 12 Drawing Sheets

OTHER PUBLICATIONS

Qualcomm Incorporated, Eudora Email, "User Manual for Windows" Version 5.1, Filtering Messages, pp. 120-133.

http://www.eudora.com/techsupport/tutorials/win_filters.html, Eudora Tutorial:, "How to Use Filters (Windows)" pp. 1-10.

* cited by examiner

FIG. 1B
(Prior Art)

| Incoming Mail | | | |
|---|---|---|---|
| File Edit ... | | | |
| Flags | Sender (2) — 180 | Date/Time | Size (3) — 170 | Subject (1) — 160 |
| | Bob Brown | 08/01/01 01:23:45 | 1 | A class #123 on "Improved ..." |
| | Charlie Brown | 08/12/01 02:22:20 | 1 | A class #123 on "Improved ..." |
| | Charlie Brown | 08/01/01 01:10:01 | 4 | A class #123 on "Improved ..." |
| | . . . | | | |
| | Bob Brown | 08/01/01 11:12:13 | 1 | Your class #123 is Cancelled!! |

Conference room C307/500 has been established as the Situation Room for Monday August 13th. (We have this room till 1:00PM so check your systems early.) This is the room where you will report and log all problems or concerns related to the ethernet rollout. We will have a team of people (IGS Deskside, WBS Deskside, Ethernet Project Team, Hall Captains, and IGS Network Support) available to assist with resolving any problems related to the ethernet rollout. You will be expected to enter your problem into the log and they will be handled on a first come, first serve basis. We also have ethernet switches, cards, cables, driver files and baluns available if you did not receive them prior to Monday.

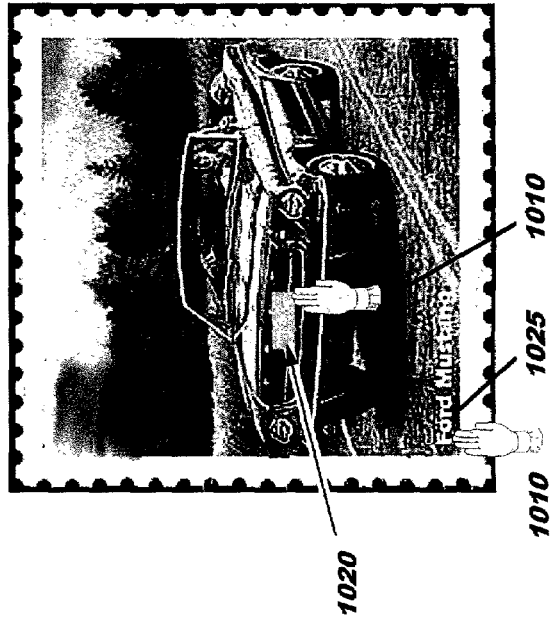

ADAPTIVE INDEXING TECHNIQUE FOR USE WITH ELECTRONIC OBJECTS

RELATED INVENTION

The present invention is related to commonly-assigned U.S. application Ser. No. 09/973/864, which is titled "Relational View of Electronic Objects" and which was filed concurrently herewith.

BACKGROUND OF THE INVENTION

1. Field of the Invention

The present invention relates to a computer system, and deals more particularly with methods, systems, and computer program products for organizing and rendering presentation of electronic objects (such an electronic mail messages, documents, and so forth) according to relationships among the objects.

2. Description of the Related Art

The general category of personal "office services" software available today includes productivity enhancing offerings such as electronic mail, or "e-mail", software; electronic calendaring software; automated alarm or reminder programs; and so forth. Many people use these systems every day while at the office, and home use of such systems continues to grow in popularity.

The current state of the art in e-mail services allows organizing incoming e-mail in an electronic in-basket according to one or more attributes which are associated with the e-mail items. Typically, the attributes which are used to sort e-mail include the arrival date and time of the message, an urgency or priority indicator associated with the message, a sender of the message, a subject of the message, etc. The values of these attributes are obtained from a very limited number of explicitly-defined information fields within the mail items, where the values are typically preceded by a keyword or tag which semantically indicates "the following information is the message subject" and so forth.

Normally, e-mail systems include an out-basket for outbound messages, and these messages may be sorted according to the same or different criteria as the messages in the in-basket.

The baskets for incoming and outbound messages are typically defined as folders, each of which has a unique entry in the file system directory of the user's computer. (For example, the file system might include a directory named "Mailbox", with subdirectories or files named "InBasket" and "OutBasket".) Most e-mail systems also include a "Trash" basket where messages can be transferred if the user wants them to be deleted, and many e-mail systems also allow the user to define additional folders; these folders are then stored in the same manner as the baskets for the inbound and outgoing messages. As an example of a user-defined folder, a user might define separate folders for people he regularly communicates with, and store mail messages received from and/or sent to these people in the corresponding separate folders. As another example, a software developer might create a "Development" folder and a "Test" folder for storing messages about the development and testing of her software development project. In some e-mail systems, the folders (including the user-defined folders) can also be subdivided into other folders. The Test folder, as an example, might be further divided into an "Open Problems" folder and a "Closed Problems" folder, and perhaps a "Test Schedule" folder as well.

In other e-mail systems, all messages are physically stored in a single database. In these systems, the organization of messages into different folders for display to the user is a logical view which is typically achieved through use of pointers.

If the user of an e-mail system wants to see his incoming mail, he selects the "In" mail folder or other type of in-basket icon, and its contents are visually presented. Similarly, when he wants to see a different folder, he selects an icon associated with that folder, and the display is then changed to show the contents of the selected folder. Once the defined sorting criteria are applied to the messages of the selected folder, the folder contents are displayed in a structure corresponding to those criteria. That is, if the sorting criteria specify that messages are to be sorted by date and time of receipt, then the messages are displayed as an in-order list according to date and time; if the messages are being sorted by sender, then the list is organized alphabetically by the value of the sender field. Newly-arriving messages are in some cases displayed in the proper place according to the sorting criteria, while in other systems newly-arriving messages are displayed at the end of the sorted messages regardless of the sorting criteria used in creating the displayed list.

One popular e-mail system is the Lotus Notes® (or "Notes"™) mail system from Lotus Development Corporation. A Notes user may choose to create one or more folders in which to organize incoming e-mail messages. By default, one mailbox exists for incoming mail, and incoming e-mail messages are sorted within this mailbox according to arrival date and time. A logical view into this mailbox is available for messages with a delivery priority of "urgent". If urgent e-mail messages arrive, these messages are displayed in a separate pane of the mailbox window. If a user defines additional folders, each of these folders may also be displayed in its own pane. ("Lotus Notes" is a registered trademark, and "Notes" is a trademark, of Lotus Development Corporation and/or IBM Corporation.)

The Eudora® e-mail product from QUALCOMM Incorporated also has mailboxes for incoming, outbound, and trash messages, and allows the user to define additional mailboxes. By default, messages in these folders are sorted according to date and time; the user is allowed to change this sort order to sort the messages by priority, sender, subject, size, status (e.g. whether a response to the message has been sent), and whether the message has an attachment. ("Eudora" is a registered trademark of QUALCOMM Incorporated.)

However, the ordering which a user can select in prior art e-mail systems is limited to the options that have been predetermined by the e-mail system developers. That is, without writing customized code, there is no way for the user to organize mail messages except by selecting from the relatively limited number of choices that are provided by a particular system.

Messages can be transmitted from one mail folder to another manually, using a drag-and-drop operation. In addition, in many systems, the user can define a mailbox "filter" which transfers messages from one mailbox to another (equivalently, from one folder to another). A filter operates as a type of macro, with the underlying programmatic support provided by the e-mail system in response to the user's specification of filter parameters. For example, criteria for invoking a transfer from a user's incoming mailbox to the trash folder might include factors such as the presence of a particular character string in the body of the mail message or in the "From" field or "Subject" field, and so forth. Upon arrival of an incoming message, it is compared to the defined filters to determine if any type of transfer should be performed. If the message matches the defined filtering criteria, then an automatic transfer may be performed. Filters can also be set to operate upon explicit request from the user (for example, by pressing a "Filter Messages" button), and may be defined to operate on folders other than the in-basket. Filters may also perform a limited number of actions other than transferring messages, depending on the support provided by the e-mail system. For example, when using the Eudora system, filters can be used to dynamically change the priority of a message, and a particular filter may perform as many as five actions which are selected from the available actions list.

In addition to sorting mail messages, color coding has also been suggested to better identify mail items of different categories within mailboxes. Color coding may also be used in other productivity software such as calendaring systems, to enable the user to quickly locate items of a certain type. For example, a user might configure her calendaring system such that all scheduled meetings on the topic of "Quality Review" are displayed in a red font.

However, while existing e-mail and other personal office services products (referred to equivalently herein as "productivity software" or "personal productivity software") may be functionally adequate, there is room for improvement in these systems. For example, a particular user's mail folders might contain hundreds or even thousands of mail messages, and these mail messages may have been accumulated over a long period of time. Existing e-mail systems are limited in their ability to present these messages in useful ways. In addition, a user might have a large number of stored calendar entries for use by her electronic calendaring application. Often, a number of the stored items are related to each other. (A user who is working on testing for a software development project, for example, will normally receive many e-mail messages which pertain to the testing of the project, and will also receive meeting notices for meetings discussing the status of the testing operation.) It would be beneficial to provide techniques whereby stored objects can be presented to the user in improved and more useful ways.

SUMMARY OF THE INVENTION

An object of the present invention is to provide improved personal productivity software.

Another object of the present invention is to provide improved techniques for rendering the presentation of objects within personal productivity software.

It is a further object of the present invention to provide improved organization of objects for use by personal productivity software, according to relationships among the objects.

It is another object of the present invention to provide improved presentation of messages and/or other objects displayed in e-mail systems (and/or in other personal productivity software), where the presentation is organized according to relationships among the objects.

Still another object of the present invention to provide improved user access to stored objects by aggregating the objects according to user-selectable relationships and rendering a view which represents a result of the aggregation.

Yet another object of the present invention to provide innovative selection techniques whereby a user can indicate which criteria may be used for organizing stored objects.

A further object of the present invention to provide a multi-level, adaptive technique for organizing stored objects.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides improved techniques for organization and rendering of electronic objects. A multi-level, adaptive index is created and used to organize stored objects in a relational view. Additional criteria for use in the index are learned upon detecting occurrence of user-configurable actions. The criteria may be selected and structured according to user-specific preferences. Preferably, default ordering criteria exist, and the user-specific choices then override these defaults. A particular user may select any organization criteria he or she desires, without being limited to those criteria which are exposed by an e-mail system as in the prior art. The criteria may change from one level of an indexed collection to another, and may also vary among siblings at a particular level of an indexed collection, providing a capability for node-specific indexing. The user thereby has much greater control over how his or her stored information is organized. By rendering a view of stored objects using the multi-level adaptive index, the user may interact with the stored objects much more efficiently (for example, to locate messages on a particular topic or messages meeting other user-selected criteria).

The present invention will now be described with reference to the following drawings, in which like reference numbers denote the same element throughout.

BRIEF DESCRIPTION OF THE DRAWINGS

FIGS. 1A and 1B illustrate conventional e-mail system displays, showing examples of incoming mail messages sorted by sender and visually separated by priority (FIG. 1A) and messages sorted by message size within sender within subject (FIG. 1B);

FIGS. 10A and 10B provide samples of electronic objects which may be used as input for the processing of FIG. 9.

DESCRIPTION OF PREFERRED EMBODIMENTS

Figure 1A:
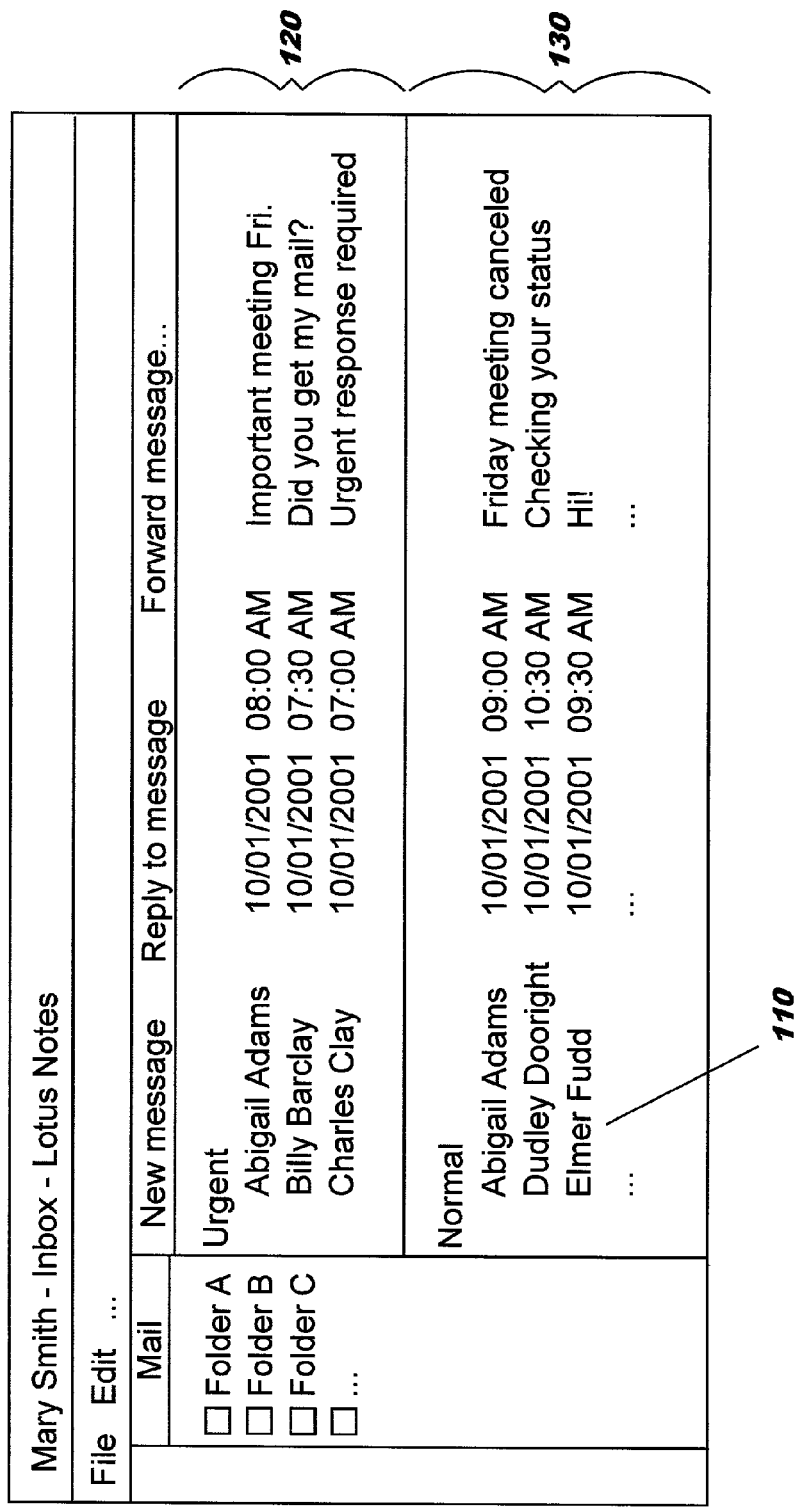

The present invention provides an innovative paradigm for organizing and/or rendering objects for personal productivity software programs. Using this paradigm, user productivity may be increased as contrasted to prior art systems, as will become apparent from the teachings disclosed herein. Preferred embodiments are described herein with reference to a visual view which is provided to a user of an e-mail system, although this is for purposes of illustration and not of limitation; alternatively, other types of renderings may be used. In addition, the techniques of the present invention may be applied to other types of personal productivity software, and the aggregated views discussed herein are not limited to presentation from an e-mail system.

According to preferred embodiments, the visual view is rendered on a graphical user interface ("GUI") using a dynamic hierarchical tree format, where the structure of the tree visually represents relationships among the objects it displays, based upon the behavior of the user. Each branch in the tree represents a subset of the displayed objects, and may be organized according to branch-specific criteria. Alternatively, formats other than a hierarchical tree may be used to convey the items and their relationships. These alternative formats include, but are not limited to, a nodal format, where each leaf of the tree represents a collection of objects based upon a set of criteria (corresponding to an index rule, in preferred embodiments), or a network format (that is, a graph-structured format where a node may have multiple entry points as well as multiple exit points).

The present invention also provides innovative selection techniques which enable a user to indicate the criteria which may be used for organizing stored objects. The user's selected criteria are dynamically added to a multi-level, adaptive index which is used for organizing stored objects to create the relational view as disclosed herein.

The present invention should not be confused with commonly-known mailbox sorting/ordering or filtering techniques, where (for example) the ordering criteria are limited to predefined message attributes which are then uniformly applied to an entire mailbox or folder. Instead, the present invention uses a user-selectable, user-definable, and user-customizable relational model which allows the rendered objects to be organized according to an arbitrarily-complex nesting structure, according to the user's individual preferences, where the user may easily and flexibly choose to organize the objects in each branch in different ways (if desired) according to one or more criteria. A multi-level indexing scheme, based on user behavior, is used to organize stored electronic objects, and newly-arriving objects may be dynamically and automatically organized according to this index as well. Furthermore, the present invention defines novel techniques whereby the multi-level index itself may be dynamically defined. Prior art organizer systems such as e-mail systems, on the other hand, normally support only one level (or a limited number of levels) of nesting of folders/mailboxes. An additional drawback of prior art systems is that they allow a limited number of sorting criteria to be in effect at a given time (that is, a combination of criteria such as subject and date/time, where date and time may be considered generally as a single criterion), and require these criteria to be selected from a relatively small number of predefined fields. The present invention, in contrast, has no such limitations or restrictions: instead, the user may choose any type of criteria for organizing, aggregating, and viewing related items. Furthermore, the sorting criteria used by prior art e-mail systems are applied to an entire mailbox or folder being displayed in the view, whereas the present invention allows the user to select branch-specific criteria at any branch of the tree. The present invention also allows a particular object to be represented in more than one location in the hierarchical tree (e.g. as a node of more than one branch); no prior art personal productivity systems are known to the inventors which provide this facility.

Preferred embodiments of the present invention also allow integrating a variety of types of objects into an indexed result or aggregation, and reflecting these types of objects in a view of this aggregation, based upon the defined relationships which are in effect. For example, referring to the testing scenario discussed earlier, if the hierarchical tree created according to the present invention contains a branch for test schedules, the objects displayed in the hierarchical tree view might represent e-mail messages related to test schedules, text documents pertaining to schedules, graphical charts showing test progress over time, and perhaps meeting notifications which were placed on the user's electronic calendar for meetings where the test schedule would be discussed. No systems are known to the inventors which integrate other types of objects with e-mail messages based upon relationships among the objects.

With the improved rendering of objects as disclosed herein, the user also has more convenient access to stored information than is available using prior art systems. The user can view the content of any node in the displayed hierarchy by first selecting an icon or other representation of the node and then choosing a view operation (for example, by pressing a "View" function key or perhaps by double-clicking the icon when using a pointing or selecting device such as a mouse or light pen). Suppose a user of the present invention selects to have her in-basket organized according to the project(s) she is working on, and within each project, to organize the messages according to activities for that project, then by the message sender and the date/time a message was received. In this scenario, the items in the user's in-basket are automatically aggregated according to the selected criteria, and the user can conveniently view all related messages for each of her projects' activities (by sender and date/time) in a single place.

Once objects have been aggregated and a view of the aggregation has been displayed, the user may then select any of the displayed objects for further inspection directly from the hierarchical tree view. At the user's option, the displayed objects may include representations not only of e-mail messages but also of other types of objects such as calendar entries, text documents, graphical objects, sound files, video files, files received using protocols such as HTTP (Hypertext Transfer Protocol) or FTP (File Transfer Protocol), and so forth. This option enables the user's productivity to increase as compared to prior art systems, where (in this example) the user of a prior art system must separately bring up her calendaring system and traverse through the calendared entries to find meetings about the project, and must separately search for related text documents and then open a text editor to display a located text document. Furthermore, to find charts that are related to the project (or, for that matter, to find any other types of objects which are stored in binary form), the user of a prior art system may have to rely solely on her memory to find the desired files, manually opening each file to determine whether it is the one of interest, as existing techniques for programmatically searching these types of files might not be readily available.

When a user has accumulated many e-mail messages (and/or other types of electronic objects) over a long period of time, where these objects may cover a huge variety of topics, trying to find selected ones of the objects using prior art approaches can present an overwhelming task for the user. For example, the user may need to find all objects that may be useful in determining how a product specification evolved, or perhaps the user might need to find an e-mail message and meeting notes pertaining to the rationale for some design choice which was not formally documented.

This can often be a time-consuming, error-prone, and frustrating experience for users; in addition, non-textual objects might have to be excluded completely from the search if searching software for those types of non-textual objects is not available.

An additional drawback of prior art e-mail systems is that, in contrast to the dynamic hierarchical view provided by the present invention, messages (which have been organized according to selected ones of the predetermined criteria) are force-fit into a flat list, requiring the user to "imagine" any sort of hierarchy between messages which may be organized using combinations of message attributes.

The manner in which the present invention alleviates these problems of prior art systems will be described herein.

The Eudora e-mail system allows a "group by subject" operation, and then collects all e-mail messages which specify that subject in their subject header. (See pages 131 and 132, "Sorting Messages Within Mailboxes", *Eudora User Manual*, which describes Eudora version 5.1 and is published on the Internet by QUALCOMM Incorporated (2001). Refer to location http://www.eudora.com/email, which provides a link to this manual, referred to hereinafter as "the Eudora User Manual".) The aggregation provided by the present invention is not limited to grouping messages by a single keyword, nor does it restrict the user to use of predefined grouping operations which have been built into a system by its developers, and furthermore, the present invention allows arbitrary types of stored objects to be included in the aggregation, where these objects have also been indexed into the aggregation according to the present invention.

Note that the related objects which are aggregated into a hierarchical tree according to the present invention are not required to be physically stored in or moved to a common folder or file system directory, but instead the aggregation disclosed herein is facilitated using dynamically-created pointers to objects. The advantages of this approach include increased speed for organizing newly-arriving objects; reduced storage requirements when an object appears in more than one place within the view; and the ability to quickly and efficiently change from one view of a user's objects which is organized according to one set of criteria to a completely different view of the same objects using an alternative set of criteria.

Note also that, in contrast to prior art techniques for sorting e-mail messages, the organizing of related objects which is provided according to the present invention is not limited to values of keywords which appear in specially-designated fields (such as the sender field, subject field, etc.): instead, the present invention allows organizing objects based on content which may appear at an arbitrary location within the object. In addition, the organization criteria and the objects which can be organized using these criteria are not limited to text format, but may include other formats such as bitmaps, sound files, and so forth.

Preferably, the present invention is implemented in software, although an implementation in hardware or a combination of software and hardware may be used alternatively. For purposes of discussion, it will be assumed that the invention is implemented in software. The computing or processing device on which the present invention operates is preferably a commercially-available computing device or processing device (referred to hereinafter as a "computing device"), which includes a personal computer, handheld computer or palm device, desktop computer, Web-enabled cellular phone, mainframe, or any other device which is capable of receiving a user's selection of organization criteria to create a multi-level index and analyzing objects using those criteria Such devices are well known in the art, and a detailed description thereof is not deemed necessary to an understanding of the present invention.

It should be noted that software implementing the present invention may be installed on the user's computing device, where the view of the indexed objects will (preferably) be rendered on this same device; or, the software may be installed (at least partially) on another machine. As an example of the latter scenario, the user's computing device might be a client in a client-server distributed computing network, where this client device contacts a server application which provides the bulk of the computing operations. In this scenario, the software implementing the present invention preferably resides partly on the user's computing device and partly on the server. For example, the software which builds the aggregation of objects according to the multi-level index might reside on the server, and the software which renders an already-indexed view (and the software which allows the user to specify new criteria for organizing the index) might reside on the user's computing device. The manner in which software embodying the present invention may be developed for installation on one device or on multiple devices will be obvious to one of skill in the art.

Software programming code which embodies the present invention is typically accessed by a central processing unit ("CPU") of the computing device(s). This programming code may be embodied on and retrieved from long-term storage media of some type, such as a diskette, hard drive, or CD-ROM. The code may be distributed on such media, or may be distributed from the memory or storage of one computer system over a network of some type to other computer systems for use by such other systems. Alternatively, the programing code may be embodied in the memory of the computing device and accessed therefrom by the CPU (e.g. using a system bus). The techniques and methods for embodying software programming code in memory, on physical media, and/or distributing software code via networks are well known and will not be further discussed herein.

When using a distributed computing network, a user's computing device may be connected to a remote server in using a wireline connection or a wireless connection. (Presence of a network connection is not required for operation of the present invention, however, as the multi-level indexing technique disclosed herein may operate upon already-stored messages and/or other objects.) Wireline connections are those that use physical media such as cables and telephone lines, whereas wireless connections use media such as satellite links, radio frequency waves, and infrared waves. Many connection techniques can be used with these various media, such as: using a modem of the user's computing device to establish a connection over a telephone line; using a LAN card such as Token Ring or Ethernet; using a cellular modem to establish a wireless connection; etc. The user's computing device may be any type of processor, such as those described above, having processing (and, when connected to a network, communication) capabilities. The remote server, similarly, can be one of any number of different types of computer which have processing and communication capabilities. These techniques are well known in the art, and the hardware devices and software which enable their use are readily available.

In preferred embodiments, the invention is implemented using object-oriented programming language(s) and techniques. However, the invention may alternatively be implemented using conventional programming languages that are not object-oriented, without deviating from the inventive concepts. Use of terms of object-oriented programming herein is not to be construed as limiting the invention to object-oriented techniques.

Referring now to FIG. 1A, an example 100 is shown depicting a prior art e-mail system where messages are sorted into ascending order by sender 110 in a user's incoming mailbox and are visually separated into different panes 120, 130 according to the setting of the priority field of the messages. This example is representative of a Lotus Notes mailbox view. (Note that the incoming messages may be physically stored in a single database, even though they have different priority settings, when using Notes software. The separate panes illustrated in FIG. 1 are then created by building pointers into that directory, where these pointers serve to logically group the messages into those that are urgent and those that are not.)

The Eudora e-mail system provides a similar display of a mailbox. The mailbox 150 illustrated in FIG. 1B is generally representative of a Eudora mailbox. (The Eudora system allows the user to configure the display to show multiple mailboxes as tiled or cascaded panes, although this has not been illustrated in FIG. 1B.) A Eudora user can select to sort a mailbox according to as many as eight to ten different criteria, and the sort order within each criterion can be set to ascending or descending. Multiple sort criteria are defined by selecting from one to eight of the displayed column headers. (See pages 131 and 132, "Sorting Messages Within Mailboxes", of the Eudora User Manual.) For example, the user might select "By Subject" as the first sort criterion, and then "By Sender" within each subject, and perhaps "By Message Size" within sender. However, the resulting display is still structured in the same manner as pane 130 of FIG. 1A: that is, a single (flat) list of mailbox items is presented. The order of items in that list represents the final result of applying all the sorting criteria Column headers of the flat display contain numeric entries which indicate the order in which the search was performed. See, for example, elements 160, 170, 180, indicating by the presence of encircled numerals 1-3 that the sort order was subject, sender, message size. The Eudora system provides many advantageous features, and is in wide use throughout the world. However, the sample messages chosen for FIG. 1B show how, in some cases, limiting the sorting criteria to fixed header values and displaying the resulting sorted messages using a flat, in-order list may have less than optimal results. In this example, related messages 191 and 192 represent notification of a class enrollment and cancellation of the same class, respectively. Because the user's choice of sorting criteria first sorts the messages on the subject field 160 (using its alphabetical contents), the messages pertaining to this class have been visually separated by a potentially-large number of intervening messages when presented to the user because the first message 191 begins with the letter "A" while the second message 192 begins with the letter "Y".

Figure 2:
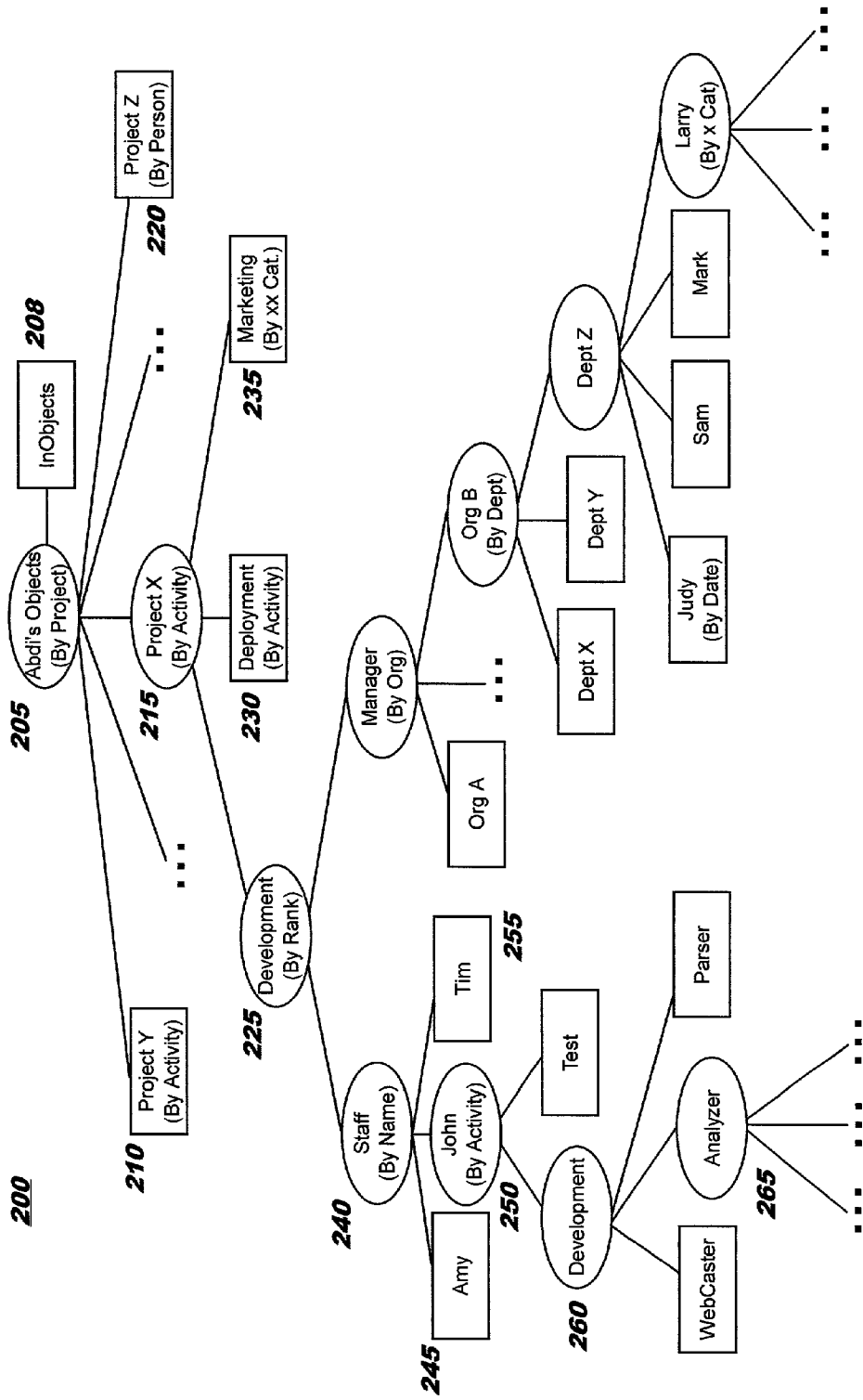
FIG. 2 illustrates an improved visual rendering of incoming mail messages, according to the present invention.

FIG. 2 provides an example 200 of a visual rendering of incoming mail messages, created according to the present invention. This example illustrates the rule-based indexing provided by the present invention. A given node of the tree may have child nodes which are nested to an arbitrarily-deep level. (An implementation of the present invention may choose, however, to place limits on the number of levels supported, without deviating from the scope of the present invention.) Node 205, for example, shows that this user "Abdi" has chosen to organize his objects according to Project. Within the Project grouping, a node is displayed in the hierarchical tree for each project for which Abdi has stored objects, based on the organization/categorization criteria which Abdi has defined. For example, Project Y 210, Project X 215, and Project Z 220 are represented in the tree hierarchy. Additional projects might also be represented, if applicable. In this example, Projects Y and X are further organized according to particular activities, while Project Z is further organized according to person. This illustrates the per-branch or per-node selection criteria available when using the present invention. Furthermore, note that "activity" is a user-selected category (which contains rule-based index criteria) which is not limited to predefined keywords which typically appear in e-mail message headers; thus, the present invention provides a more flexible organization technique than that available in the prior art. Because there is no specific "activity" keyword for which an indexing engine can search when building the multi-level index, a user of the present invention may explicitly define one or more search patterns (or rules, equivalently) to use in locating the activities. For example, with reference to Project X 215, the user of the present invention has defined the activities of interest to be "Development" 225, "Deployment" 230, and "Marketing" 235. Therefore, when the indexing engine locates an object pertaining to Project X, the object will then be searched to see if it pertains to one of these subcategories. With reference to the Development subcategory, for example, the indexing operation might comprise searching the object contents for presence of the words "develop", "developer", or "development". As a further illustration of the power and flexibility of the present invention, a rule might be specified which semantically indicates that presence of any of the strings "Amy", "John", or "Tim" denotes an object that belongs in the Development category 225—perhaps because these are names of Abdi's co-workers on the development of Project X 215. (See nodes 245, 250, and 255, where these names are indicated as members of the Staff subcategory 240.) The search expressions or rules might also support use of wildcards or regular expressions, for example by specifying the string "develop* OR Amy OR John OR Tim" as the inclusion criteria for the Development category 225. (It will be obvious to one of skill in the art that many different syntax forms may be used for specifying rules and ordering criteria Therefore, it should be understood that the examples provided herein are merely for purposes of illustration.)

In addition to (or perhaps instead of) criteria for inclusion of objects, criteria for exclusion may also be supported. Suppose, for example, that Abdi occasionally receives e-mail messages discussing "development" of his stock portfolio. These messages do not belong in Development category 225, and thus Abdi might specify an exclusion criteria having semantics of "but NOT (stock AND portfolio)". (Refer to FIGS. 4 and 6 for a more detailed discussion of the manner in which criteria may be used to build rules when using preferred embodiments of the present invention.)

It should also be noted that while the nodes in tree view 200 include text indicating the criteria used to aggregate the contents of their child nodes (that is, the "By . . . " phrases within the node icons, such as "By Activity" in nodes 210 and 215), this is for ease of understanding. An implementation of the present invention may choose to include this descriptive information, or to omit it, or may provide the user with a configuration option whereby the user controls whether the strings are displayed. Some nodes in FIG. 2, such as Amy 245 and Tim 255, do not include this descriptive phrase: in this example, the absence of the text indicates that the default ordering criteria is used for this node. When the phrases are used, the value to be displayed for a particular node is preferably a category name or other text string provided by the user when specifying the organizing criteria for that node. (A configuration interface may be provided to allow the user to specify settings for options such as whether these descriptive phrases are displayed.)

An optional enhancement of the present invention allows the user to specify locations (such as directories or databases) within which the objects must be located in order to be processed by the indexing engine for inclusion in the aggregation and resulting views. In this manner, the user may have more control over "stray" objects that might otherwise coincidentally meet his selected organizing criteria A value for this option may be specified using the configuration interface discussed above.

Another optional enhancement of the present invention is illustrated by node 208, which shows a branch in the tree for "InObjects". When this option is selected, objects which have not been organized into any other category (for example, because they did not match any criteria) are represented by this node. In addition, objects which are newly-created or newly-arrived after the view 200 has been created are preferably represented by this common node of the tree, rather than being automatically indexed and inserted into the tree. This may be useful, for example, as a way of allowing the user to specify whether the tree and its contents can change (e.g. due to the arrival of new messages) while the user is viewing it. The user can then select to apply the buffered objects from node 208 at his convenience, for example by selecting an "Update Tree View" choice from a pull-down menu; or, alternatively, the tree might be updated automatically upon occurrence of some predetermined event. Examples of these predetermined events include (1) expiration of a timer and (2) the user's request to alter the tree by expanding or contracting a branch. Preferably, when an event-driven approach is used, the event(s) is/are limited to those for which refreshing the tree view is likely to cause minimal disruption to the user. If this option of buffering objects in a common node until occurrence of an event is not selected, then each new object may be immediately processed and inserted into the hierarchical view at one or more appropriate locations. (in alternative embodiments, distinct nodes may be used to represent those objects which do not match any criteria and those objects which are new and have not yet been processed using the criteria, rather than using a single InObjects node.)

As yet another option, the user may be allowed to specify (preferably, using a configuration interface, or when specifying the organizing criteria) how selected branches of the tree view should be displayed when the tree is initially rendered. For example, user Abdi might choose for his hierarchical tree view to expand all branches along the path of (1) Project X 215, (2) Development 225, (3) Staff 240, (4) John 250, (5) Development 260, and (6) Analyzer 265, as illustrated in FIG. 2, while leaving other branches collapsed until explicitly expanded. A user of the present invention may select a node from a tree view such as tree view 200 and request expansion of this node's branch in a number of ways, such as by double-clicking on the node, choosing an "Expand" choice from a pull-down or pop-up menu, pressing an "Expand" function key, and so forth; expanded nodes may be selectively collapsed using similar techniques. Optionally, the rendered tree view may contain an indication of those nodes for which the expand choice is operational (that is, the nodes which have child nodes). In FIG. 2, this indication is provided graphically through use of rectangular nodes which indicate that there are other objects or nodes available for viewing, and oval nodes indicating that no expansion is available. See, for example, the graphic which appears as a rectangular shape at node 208, indicating that the "InObjects" node can be expanded. (As will be obvious, many alternative approaches for conveying this information may be used instead of the graphical shapes shown in FIG. 2.)

As stated earlier, the user may select to view the contents of any particular node by selecting the icon (or other corresponding representation) and then choosing a "View Contents" or similar option. If the node represents a folder, this choice is preferably analogous to the "Expand" choice just described. If the node represents an object, then the proper object viewer is invoked to view the object, using techniques which are known in the art. For example, if the "View Contents" choice is selected for an image file, an image viewer which is resident on the user's computer is preferably invoked and passed the name of the selected image as an input parameter. (The manner in which various types of viewers are registered with the operating system of the user's computer, and in which parameters are passed to an invocation of a selected viewer, does not form part of the present invention.)

Note that the objects which are indexed need not be stored on the user's computer. Instead, they need only be accessible to the computer which performs the indexing. For example, the objects might include files which are stored at selected locations in a distributed computing network. In this case, the user preferably defines the location of the objects using their network address, such as a Uniform Resource Indicator or "URI". As stated earlier, the user may provide locations of his pertinent objects and files using a configuration interface.

While the leaf node objects illustrated by the hierarchy in FIG. 2 might potentially all be textual objects, the present invention is not limited to organizing and aggregating text objects, as stated earlier. Suppose, for example, that view 200 represents only a subset of the objects which are stored on user Abdi's computer. Many other objects which are unrelated to this Project hierarchy 205 might exist. The user might have more than one hierarchical tree view available for rendering, where other views pertain to different objects and/or use different ordering criteria. Alternatively, the user's objects might all be organized as branches within a single "super view", where the user is then responsible for defining the branch-specific organization criteria to properly organize the objects. Abdi might, for example, have hundreds or even thousands of graphic objects such as digital photographs stored in storage which is accessible to his computer. Some of these objects might have arrived as attachments to e-mail messages; others might have been delivered to Abdi's computer using FTP requests or perhaps in response to requesting delivery of a Web page which included embedded graphical objects; still others might have been uploaded from Abdi's digital camera directly to his hard drive. Regardless of the source of the images, or their naming conventions, or even which disk drive or directory they are located in, the present invention enables easily and automatically categorizing the images using user-selectable criteria.

Figure 3:
FIG. 3 depicts an image from an object that may be organized according to the present invention, and which also may be used to define a criterion for this organizing operation.

FIG. 3 shows an example 300 of an image that might be organized as an entry in a tree view using these inventive techniques. This image is of a postage stamp picturing a Ford Mustang automobile. Notice that the Mustang logo is visible in this image (see element 310). By selecting this portion of the image to be an organizing criterion (for example, by drawing a selection box around it using an image-processing tool), the techniques of the present invention can be used to programmatically organize all of Abdi's photos and other images which contain this logo into a common folder. A branch of the tree view might be named "Ford", for example, and might have child nodes for different models of Ford cars. For the "Mustang" child node, the organizing criteria might then include the logo bitmap as well as an inclusion criteria such as "FORD AND (CAR OR AUTO*)" which can be used to find the text-based objects and include them in this branch of the tree along with the photos which will be included using the logo bitmap.

As another example of organizing images, suppose Abdi's digital photo collection includes many pictures of family members, but these pictures are scattered among various subdirectories or other storage locations. Further suppose that Abdi's family pictures are often taken in front of one or more of his favorite pieces of artwork, and that Abdi would like to assemble all of the family pictures together to create a digital album. A representative portion of each of the pieces of artwork, selected from pictures that include an image of the pieces of artwork, might be stored as a bitmap which is then defined as an inclusion criterion for aggregating objects within a branch of the hierarchical tree view, according to the present invention. Upon operation of the indexing engine, the objects which include this representative bitmap (or bitmaps) are programmatically located and aggregated into the corresponding branch. Abdi then has a convenient way to access the stored images by selecting their nodes from the tree view. (Techniques for comparing bitmaps to inclusion criteria are well known in the art, and implementations thereof are readily available for use by an implementation of the present invention. Such techniques are used, for example, in scanning stored fingerprint files for law enforcement purposes.)

Figure 4:
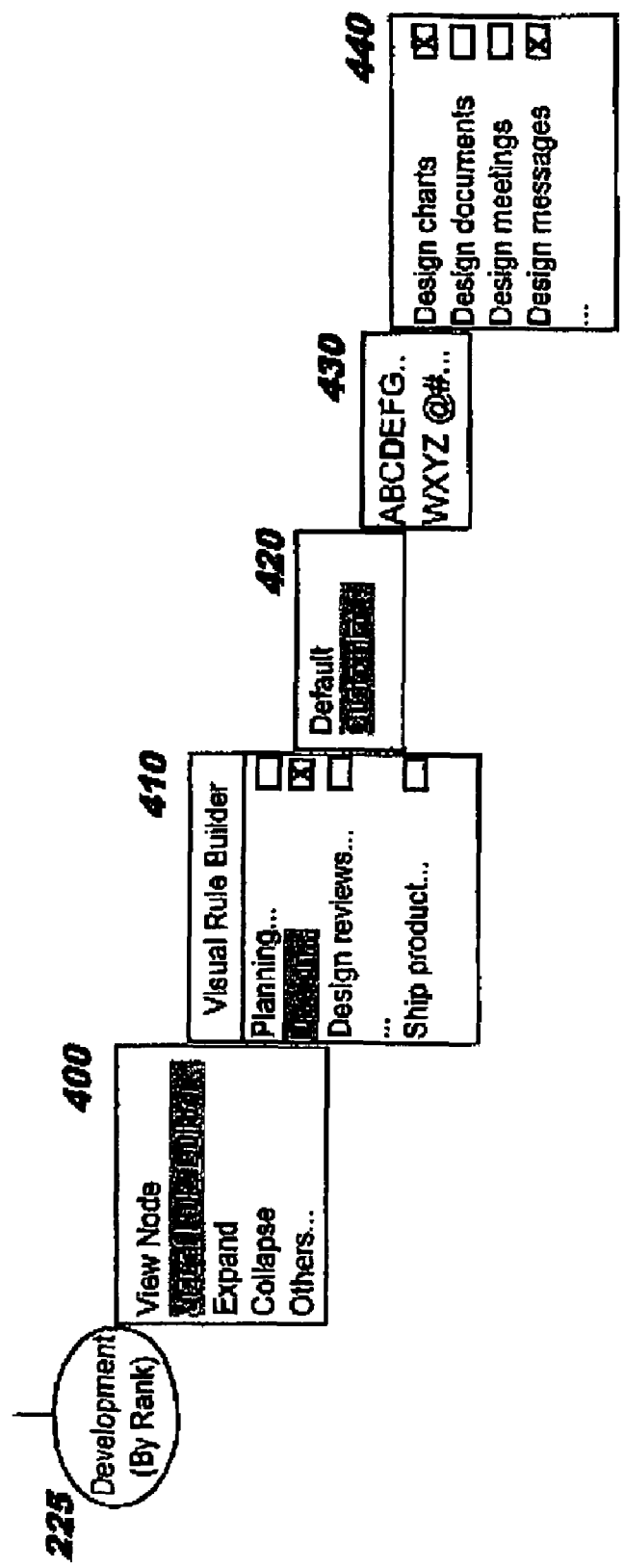
FIG. 4 shows how a user may be allowed to define (or re-define) the rules (or similar index evaluation technique) to be used by an indexing engine when creating a visual rendering such as that illustrated in FIG. 2, according to the present invention.

Turning now to FIG. 4. a subset 225 of the free view 200 of FIG. 2 is shown, and pop-up windows 400, 410, 420, 430, 440 are illustrated as examples of how a user may visually define (or re-define) the organizing rules in use for the visual rendering in the tree view, according to preferred embodiments of the present invention. This example shows the user invoking a visual rule builder technique for changing the organizing criteria for Development node 225, presumably to organize the node according to some criteria other than "By Rank" which is shown in node 225 as the currently-used criteria. (As will be obvious to one of skill in the art, this visual rule builder is merely representative of one technique that may be used, and other techniques may be substituted without deviating from the inventive concepts disclosed herein.)

Using the approach shown in FIG. 4, the user may indicate his desire to alter the organizing rules by (for example) pressing a function key or "right-clicking" with his mouse device or otherwise choosing this operation. This preferably causes a window such as pop-up window 400 to be displayed. offering several choices to the user such as viewing the contents of a node, using a visual rule builder (which has been selected in the example of FIG. 4), expanding or collapsing a node, and so forth. Alter choosing to use the rule builder, another window 410 is preferably displayed, where the contents of the window preferably include alternative categories that can be used for organizing the node's contents. (These alternative categories are preferably defined earlier by the user or provided as built-in defaults and deployed at the time of installing the implementation of the invention.) Suppose the user chooses "Design" as a criteria for organizing this node's content, as indicated by the visual shading and checked box in window 410. Another level of pop-up window, shown as window 420, appears next in this example, where window 420 allows the user to choose either to customize this category or to select the default (i.e. already-defined) customization for this category. If the user chooses "default", then it is not necessary to display any subsequent pop-up windows, and the default organizing criteria will apply for node 225; otherwise, when the user chooses to customize this category, another pop-up window appears. In the example of FIG. 4, pop-up window 430 is displayed to enable the user to quickly locate his already-defined index criteria using an alphabetical index menu to easily access the criteria in alphabetical order. For example, to see the index terms beginning with the letter "D", the user selects "D" from pop-up window 430. The corresponding index terms are then displayed in another pop-up window 440, as illustrated, enabling the user to select one or more of the defined terms or organization criteria. In the example, the user has selected a term "Design charts" and another term "Design messages". (In an actual tree view, these terms correspond to the node for which organizing rules are being customized.) In addition to (or instead of) displaying an alphabetic index representation in window 430, thumbnail sketches or other forms of non-text representations might be used. For example, a miniature version of the Mustang logo might be presented in window 430 to enable the user to select the Mustang image as an index criterion. A representation might also be included for grouping index terms which are not easily represented using other approaches, for example by including a grouping such as "Miscellaneous". After completing the selection process in window 440, the user might return to window 430 to select additional criteria for use in organizing this node. (Note that the layout of windows 400-440, where one window appears to the right and slightly beneath its predecessor, is for purposes of illustration only; other presentation styles may be used alternatively.)

Figure 5:
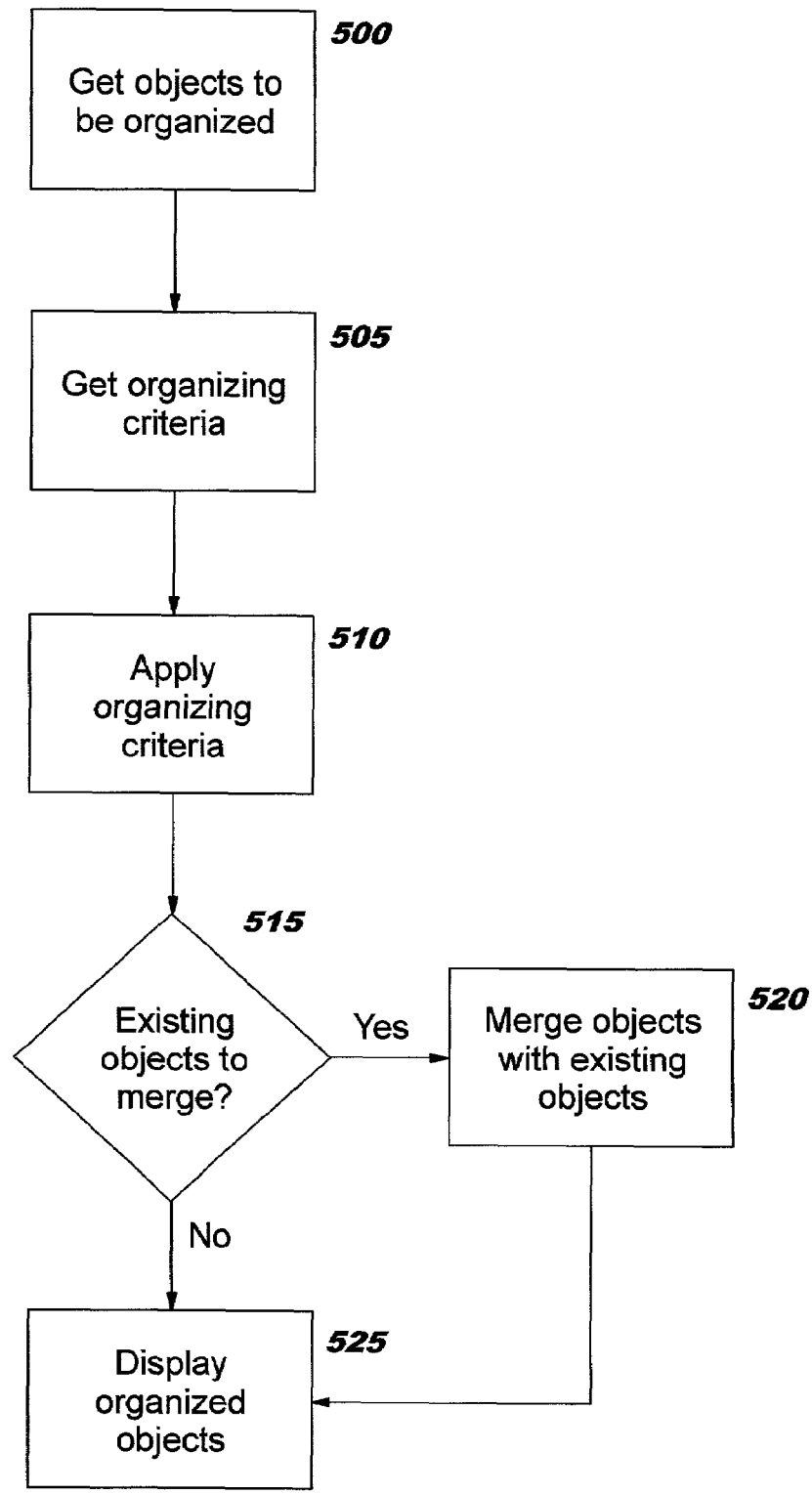
FIGS. 5-7 depict flowcharts illustrating logic with which preferred embodiments of one aspect of the present invention may be implemented.
Figure 6:
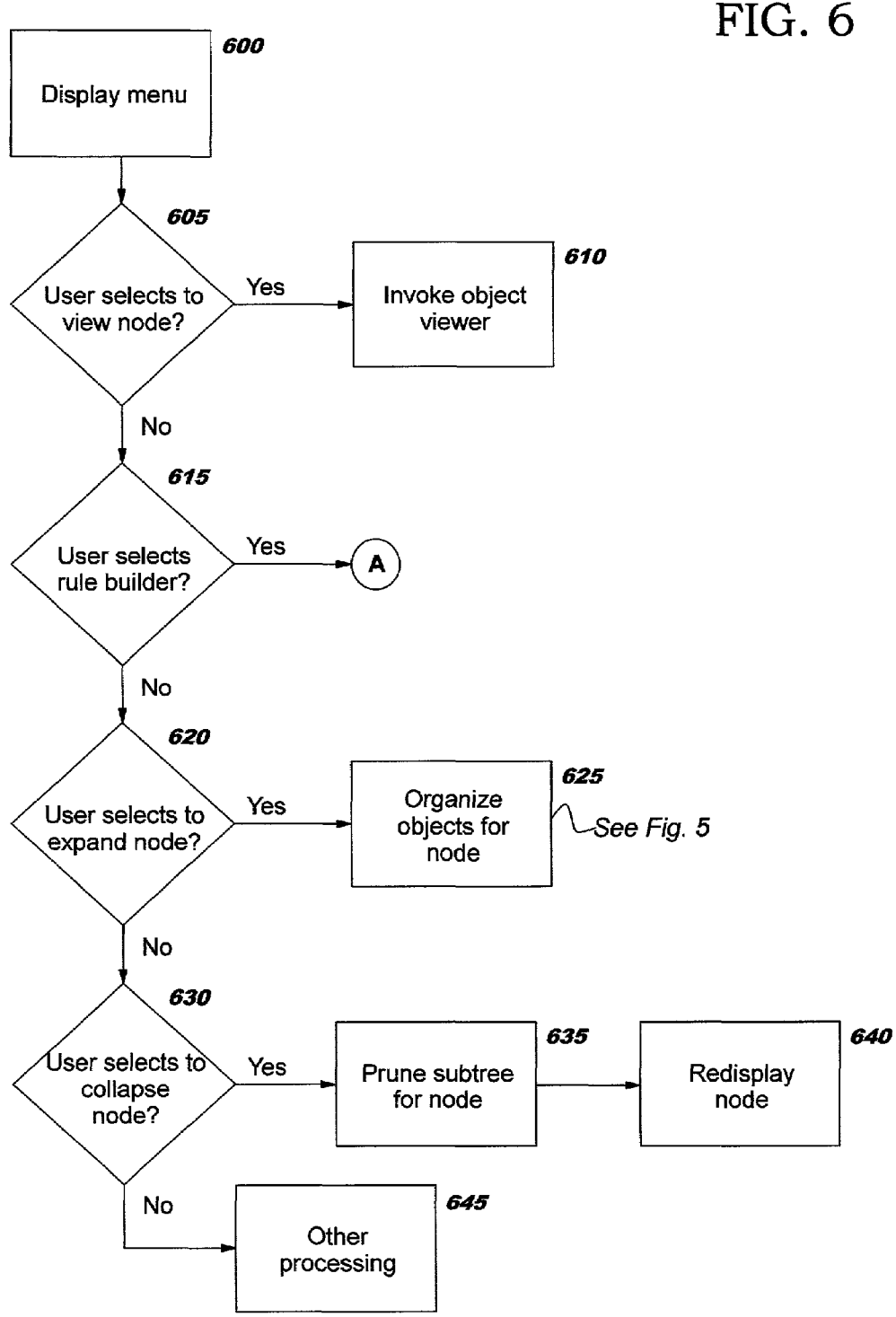
Figure 7:
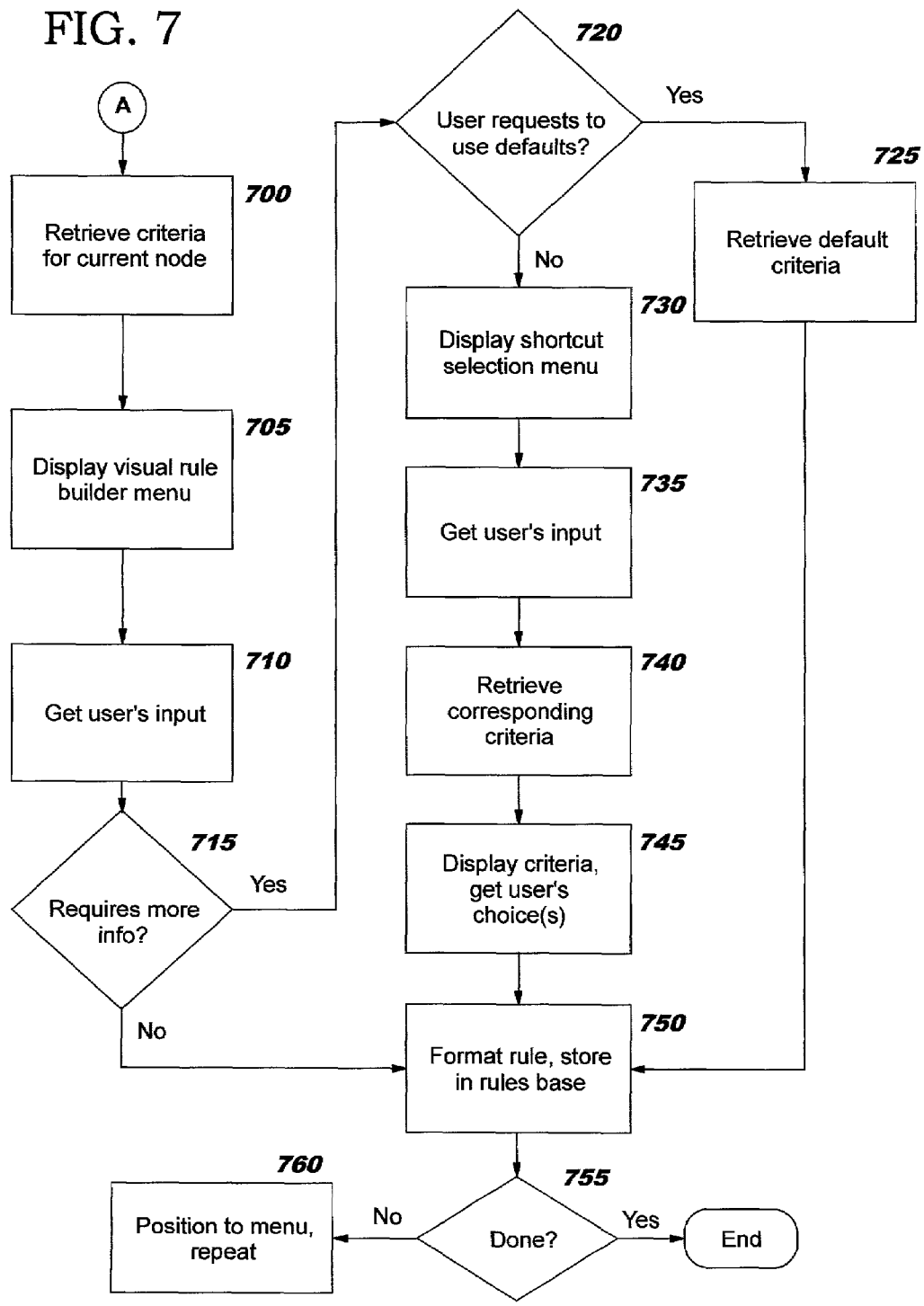

The flowcharts in FIGS. 5-7 illustrate logic which may be used to implement a preferred embodiment of one aspect of the present invention The processing of this aspect, which comprises creating the relational object view which has been described, operates in response to particular events. The logic of FIG. 5 is preferably invoked when the user opens the tree view hierarchy, and the logic constructs and renders the object view. In preferred embodiments, this logic is also invoked (see Block 625 of FIG. 6) when the user requests to expand a node from the currently-displayed relational view, and the logic constructs and renders a subtree of that node. FIG. 5 may also be invoked when a new object arrives, and/or when new organizing criteria are defined, and in such cases creates a refreshed view. (Other triggering events might be defined for invoking FIG. 5, such as expiration of a refresh timer, if desired.) As shown therein, the process begins in Block 500 where all the objects to be organized are retrieved (for example, from the "InObjects" object repository). If desired in a particular implementation of the present invention, the InObject repository may also store objects (that is, pointers to such objects) which on previous iterations did not meet any of the organizing criteria for placing them into the hierarchy. Those objects may also be retrieved and (re)processed against the currently-defined criteria, if desired. The objects may be of a variety of types, including e-mail messages, bitmaps, textual documents, and so forth. (As stated with reference to node 208 of FIG. 2, indications of the new and the not-categorized objects are preferably buffered for updating the tree view in a controlled manner.) Block 505 retrieves the organizing criteria, which in preferred embodiments are stored as rules in a rules repository.

These rules may include default rules as well as user-defined rules. (See the discussion of FIG. 7, below, for more information on defining these rules.) An object hierarchy agent process is then invoked (Block 510) to apply the criteria to the objects to be organized. Block 515 checks to see if there are any existing (i.e. already-indexed) objects to be merged with these objects. If so, then the merge proceeds (Block 520) by invoking a relational modeler process which creates an aggregated relational model of the user's objects. Finally, the organized objects are rendered in the relational view (Block 525). Preferably, a process such as a presentation manager component is invoked to perform the actual rendering of the constructed hierarchy. Presentation manager components are well known in the art, and are readily available.

In addition to retrieving objects which have not yet been organized, Block 500 may retrieve other objects. For example, if new organizing criteria have been defined, and also when the user requests to expand a node, it may be desirable to re-process all the user's objects to determine which objects meet the currently-applicable criteria. In this case, the relational modeler process of Block 520 is invoked to construct a relational view of all of the objects which have been organized (and the test in Block 515 may be omitted).

The logic in FIG. 6 may be used when the user requests a pop-up menu (or similar selection means) such as that illustrated by element 400 in FIG. 4. This request may be initiated through a right-click operation with a mouse device, or with an appropriately-adapted function key, or through similar means. At Block 600, a menu of available choices is displayed. This menu is represented by the example window 400 in FIG. 4. Blocks 605, 615, 620, and 630 then check to see what the user selects. If the choice is to view a node (Block 605), then a node-specific viewer is invoked (Block 610), as was discussed earlier. If the choice was to use the visual rule builder (Block 615) as disclosed herein, then processing continues at Block 700 of FIG. 7. If the user chooses to expand the current node (Block 620), then Block 625 organizes the objects that will appear in the subtree for this node by invoking the processing of FIG. 5. If the user chooses to collapse the current node (Block 630), then the subtree for that node is pruned (Block 635) and the node is redisplayed (Block 640) without its child nodes. If some other choice is available and is made, then Block 645 processes that choice accordingly.

Referring now to FIG. 7, logic is shown which may be used to implement the visual rule builder of the present invention. This logic is invoked when the user chooses to visually build rules for a node, as reflected by Block 615 of FIG. 6. A repository containing criteria for the current node is consulted (Block 700), and used to construct a menu (exemplified by window 410 of FIG. 4) which is displayed to the user at Block 705. Once the user has selected one of the displayed choices (Block 710), a test is made (Block 715) to see if more information is required. If so, then processing continues at Block 720; otherwise, control transfers to Block 750.

At Block 720, a test is made to see if the user requested to use the default criteria (see window 420). If so, then those defaults are retrieved (Block 725), and processing continues at Block 750. Otherwise, Block 730 preferably presents a shortcut selection menu such as that shown as window 430, and Block 735 obtains the user's choice from that menu. The choice is then used (Block 740) to retrieve the corresponding criteria With reference to FIG. 4, Block 735 comprises determining that the user selected the letter "D", and Block 740 finds that the criteria beginning with the letter "D" include "Design charts", "Design documents", "Design meetings", and "Design messages". These criteria are used to construct a menu such as menu 440, which is displayed to the user (Block 745) and from which the user can make selections. (That is, for the example of FIG. 4, the user indicates which of these criteria she would like to use in organizing a Design node as a child node of Development node 225.) After having obtained the selections, control reaches Block 750.

Block 750 formats a rule from the criteria which the user has indicated this visual rule building process, and stores that rule in the rules base. If the user wishes to continue defining rules for the current node in this manner (a negative result for the test in Block 755), then the appropriate menu regains control (Block 760) and the process is repeated. (That is, if the user wishes to define more organizing criteria using a different letter of the alphabet via window 430, then control returns to Block 730; alternatively, the user may wish to return to the menu in window 410 or 420, in which case control returns to Block 710 or 720, respectively. Or, the user may select a different node from the displayed hierarchical view and define rules for that node by returning to Block 700.

In this manner, a multi-level index is dynamically constructed—according to an individual user's requests—for use in organizing electronic objects according to relationships. The hierarchical view constructed using this very powerful and expressive index promises to enable users to find information much more quickly than when using prior art systems, thus offering significant productivity gains.

Figure 8:
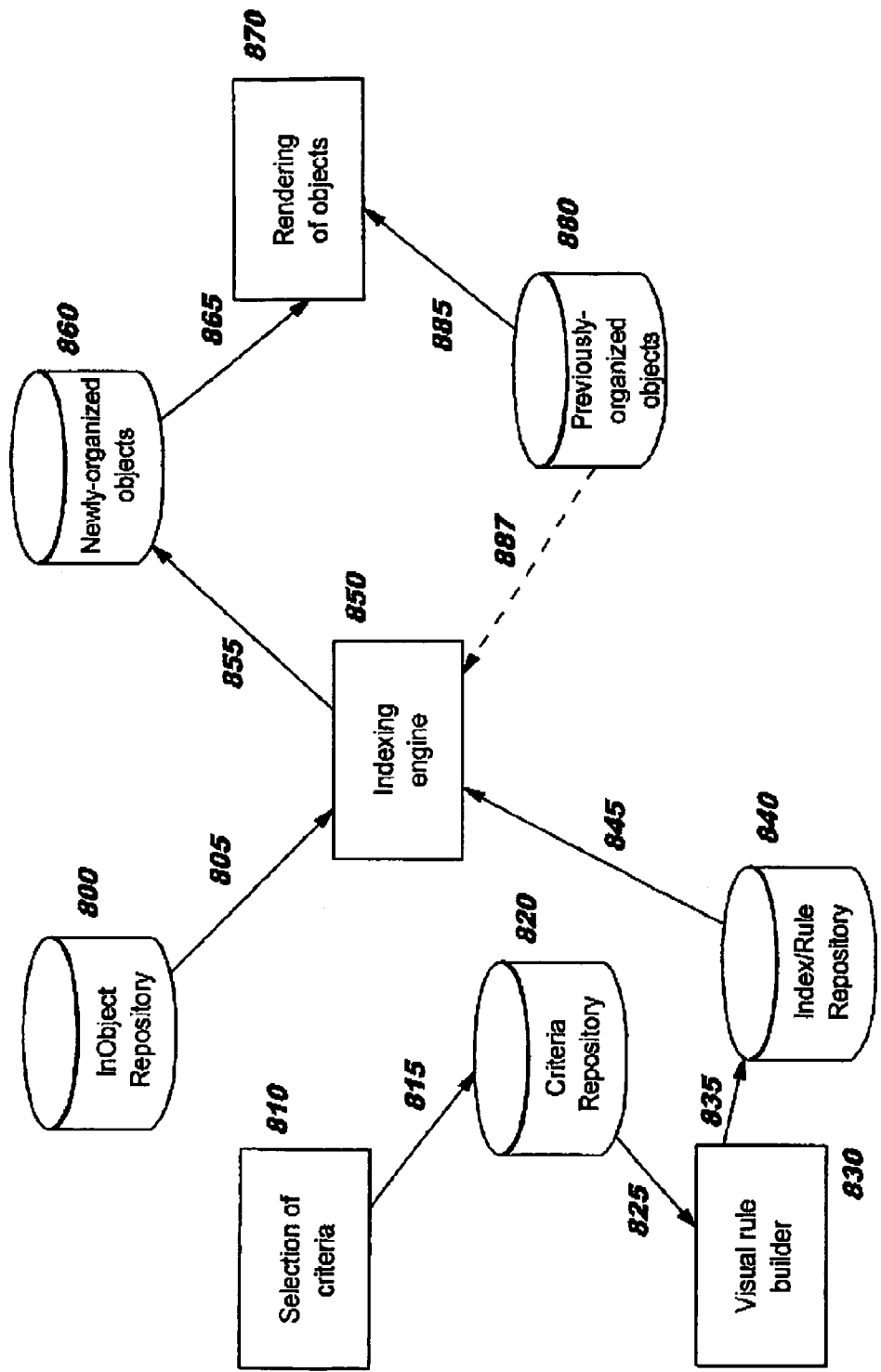
FIG. 8 presents a diagram showing interaction of components of the present invention.

In embodiments of the present invention, the categories and criteria which are presented to the user for building rules (see windows 410 and 440 and their descriptions, above) may be entered manually by the user (e.g. by typing text into a prompting window or other text entry means). Other sources for obtaining this information might also be provided, such as enabling a systems administrator to manually provide enterprise-wide defaults which each individual user can then override as desired. In other embodiments, either or both of these types of information may be obtained automatically by observing the individual user's actions. A further aspect of the present invention provides novel techniques for this purpose, enabling a user to dynamically indicate the criteria which may be used for organizing stored objects, as mentioned earlier. FIG. 8 provides a diagram showing how components used in this process fit in with components used by the relational tree view which has been described with reference to FIGS. 2-7. FIG. 9 will then be described, illustrating logic which may be used to implement this further aspect.

Referring first to FIG. 8, an "InObject" repository 800 (which was described with reference to node 208 of FIG. 2) stores a collection of objects which are either (1) newly-arrived or newly-created, and therefore have not yet been processed into the relational hierarchy, or (2) uncategorized because they did not meet any criteria during a prior processing operation. (As stated with reference to FIG. 2, repository 800 may be a separate data store, or it may be simply a logical view of another data store such as "previously-organized objects" 880.) At some point, the objects in repository 800 are used as input 805 to indexing engine 850, creating 855 a collection 860 of newly-organized objects. These newly-organized objects 860, along with previously-organized objects 880, are used as input 865, 885 to a rendering process 870 which creates a view such as that shown in FIG. 2. It may be desirable to re-index the previously-organized objects 880, in which case those objects are input 887 to indexing engine 850. For example, previously-organized objects may be re-organized when new organizing criteria are defined. Furthermore, it may be desirable in some situations for the indexing engine 850 to always process both the repository 800 and the previously-organized objects 880, creating a new (logical, if not physical) version of repository 880 rather than creating a separate repository 860 of newly-organized objects. In this latter case, rendering process 870 has a single input.

The criteria used for organizing the relational view may be selected using process 810, as will be explained below with reference to FIG. 9, and those criteria are then stored 815 in a criteria repository 820. When the user invokes a visual rule builder 830 (or, alternatively, some other type of rule builder), the criteria in repository 820 are used as input 825 for building new rules. Those rules are then stored 835 into an index/rules repository 840 for use as input 845 by indexing engine 850.

Figure 9A:
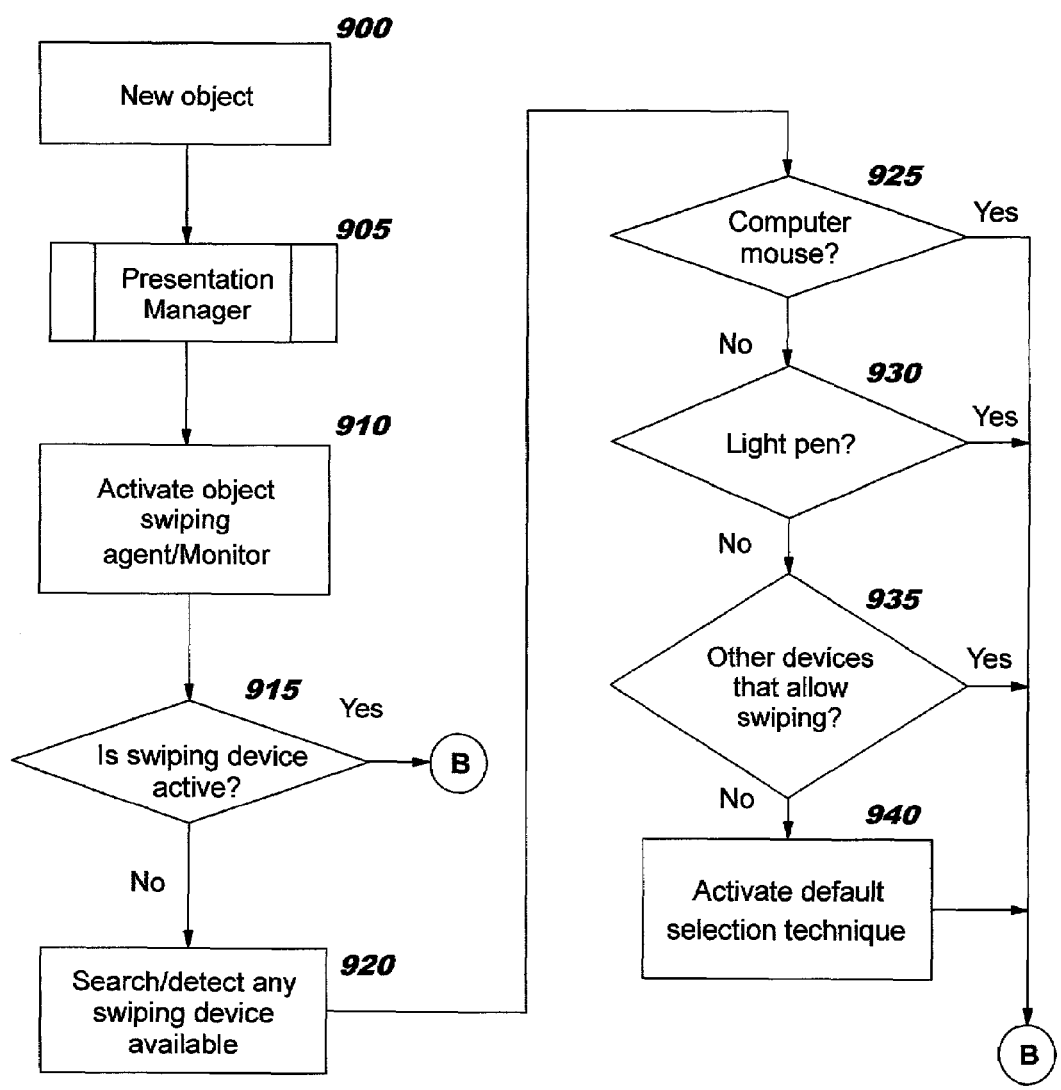
FIG. 9 depicts a flowchart illustrating logic which may be used to implement another aspect of the present invention.
Figure 9B:
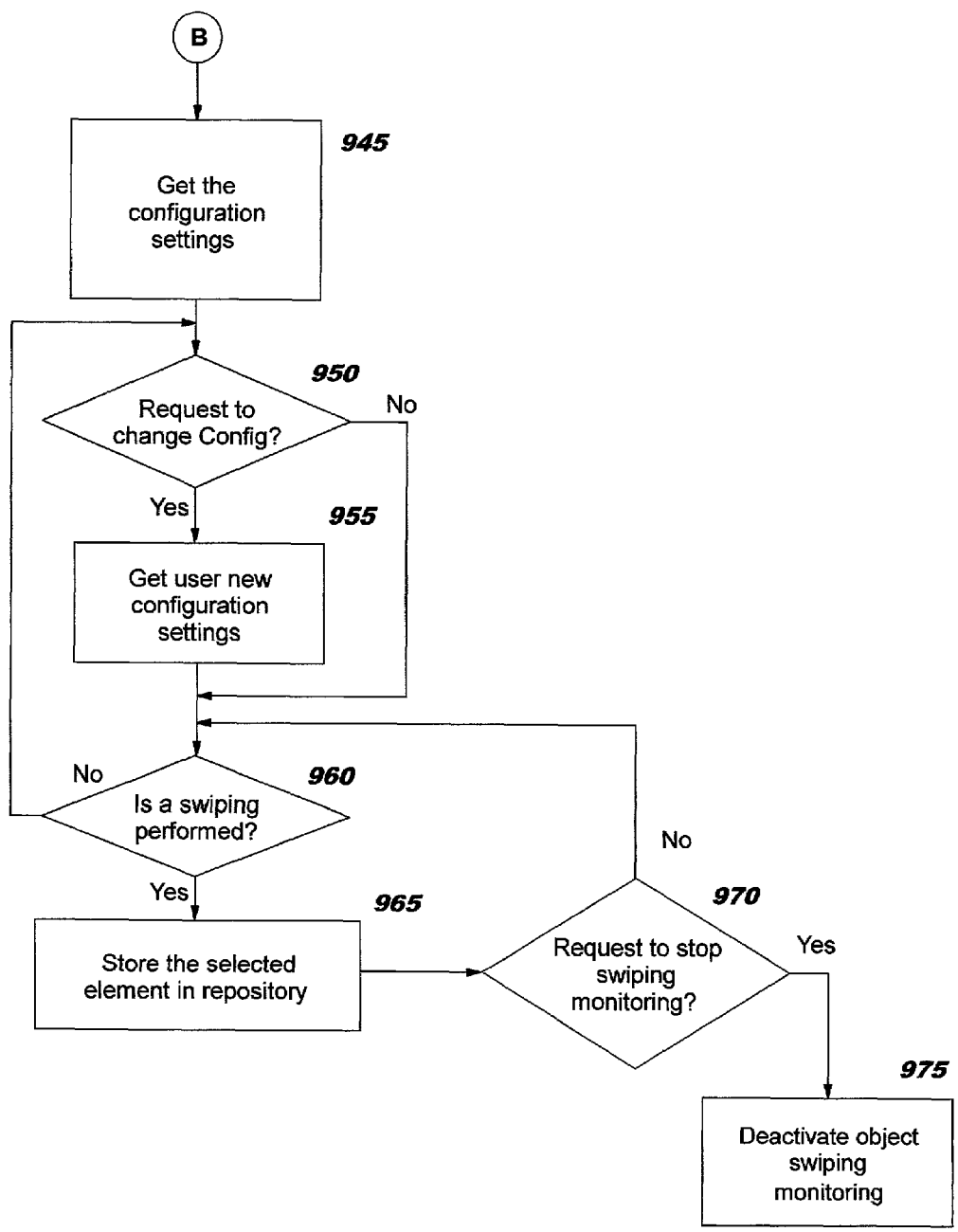

Turning now to FIG. 9A, the dynamic criteria selection process of the further aspect of the invention is illustrated. This selection process is referred to hereinafter as "swiping", and in preferred embodiments comprises swiping multiple times across some element of an object to indicate that this element should be selected as an organizing criterion. ("Swiping", as is known in the art, refers to an operation such as holding down the left mouse button while dragging the mouse or dragging one's finger across a plasma panel, thereby signifying a selection operation.) For example, in a textual document, the element to be selected by swiping may be a word or phrase, or even a partial word. Refer to FIG. 10A for examples, where a hand symbol 1010 is used to signify that the user has swiped text shown as selected at 1005 (the abbreviation "IGS") and 1015 (the phrase "Ethernet Project") from a textual object 1000 (which in this example discusses an upcoming meeting). The user in this case might wish to use these selections as organizing criteria for one or more nodes related to his department's activities. FIG. 10B illustrates another example of elements that might be selected using this swiping technique. A hand symbol 1010 is used again to indicate the swiping motion, and for this bitmap of a Ford Mustang, the user might swipe a rectangular section indicated at 1020 to use the Mustang logo image as a criterion, and/or he might swipe over the word "Ford" which appears at 1025 to select this portion of the image.

Referring again to the flowchart, beginning at Block 900, a new object arrives or is created, and is passed to a presentation manager component (Block 905) for rendering. A swiping agent or monitor is activated (Block 910). Blocks 915-975 illustrate operation of a preferred embodiment of this swiping monitor, which begins at Block 915 by checking to see if a swiping device is currently active. If not, then processing continues at Block 920 which preferably searches the user's computer (using prior art techniques) to determine whether any swiping device is available. If a swiping device is already active, on the other hand, control transfers to Block 945 of FIG. 9B.

Continuing with the description in FIG. 9A, Block 925 checks to see if a computer mouse was detected. If not, then Block 930 checks to see if a light pen was detected. If not, Block 935 checks for another type of swiping-capable device, such as a plasma panel. Audio or visual means for swiping might also be present. For example, a device for detecting that a user passes his eyes repeatedly over a document element might be available for use with the swiping process. Or, an audio device might be available which can be configured to detect a swiping operation (for example, by the user speaking commands for this purpose). If all the tests in Blocks 925, 930, and 935 are negative, then Block 940 preferably activates a default selection technique. Otherwise, when any of these tests has a positive result, the detected device is available for swiping. Processing continues at Block 945 of FIG. 9B.

In Block 945, configuration settings pertaining to the swiping operation are preferably retrieved from a user-specific configuration file. (Default settings may be provided, if desired, which a user might then choose to override.) Because performing a single swiping operation is commonly used in the prior art to indicate simple selection, users of this swiping technique will preferably select settings other than a single swipe to indicate that criteria selection according to the present invention is being requested. For example, the configuration settings might specify that swiping twice across an element (or perhaps some number more than two times) signifies this type of swiping. After retrieving the stored configuration settings at Block 945, the user may then be asked whether he wishes to change these settings (Block 950). If so, the new settings are obtained (Block 955) and stored.

Now that the user's swiping preferences are known, Block 960 monitors to see if a swiping operation is performed. If not, the user may be allowed to redefine the configuration settings by returning control to Block 950. If a swiping was indicated, however, then Block 965 stores the selected element in the criteria repository (see element 820 of FIG. 8). Block 970 checks to see if the user has requested to stop monitoring for swiping operations. If so, then swiping is deactivated (Block 975); otherwise, control returns to Block 960 to continue monitoring for swiping operations.

In this manner, the system according to the present invention can dynamically learn new organizing criteria in a very user-friendly (and user-customizable) manner. This technique may be used with swiping-capable devices that are considered "conventional" in the prior art, such as mouse devices, light pens, and plasma panels, and it may also be useful with devices or mechanisms which have not yet been imagined. The criteria selected using the swiping technique are fed back into the system, as mutated graphically in FIG. 8 (see elements 810-825, for example), and may be presented to the user fur building rules to be used by an indexing engine (see, for example, the discussion of FIG. 4).

As has been demonstrated, the present invention provides a number of advantages over the prior art. Whereas prior art e-mail systems allow users to sort e-mail messages on fixed message attributes (and, in some systems, on the presence of user-defined keywords within message bodies), and then display all the messages of a folder or mailbox in a flat view using this set of fields for sorting, the present invention enables a very flexible, dynamically-constructed hierarchical view (or other structured view) of an aggregation of electronic objects which is organized using a user-specified, multi-level index. The disclosed techniques provide enhanced graphical presentation of information, giving an intuitive view of relationships among objects, and enable improved access to stored information. Using the disclosed techniques, each individual user can control how his or her information is organized, rather than being limited to choices which the developers of the e-mail system have chosen to expose. In addition, the multi-level indexing technique of the present invention enables a tree view to change dynamically, as new objects are received which meet active organization criteria, and allows node-specific organizing criteria for an arbitrarily complex level of nesting. This is in contrast to the static views provided by prior art systems (where the attributes are either in use for all messages arriving into the current mailbox or folder, or they are not in use for any messages of the mailbox or folder).

The swiping technique which was disclosed may be used to dynamically teach new criteria to the system, providing a user-specific adaptive index.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

We claim:

1. A computer-implemented method for indicating criteria for organizing electronic objects, comprising steps of:

detecting, by a user input monitor, that a user has swiped across an element of a rendered representation of an electronic object in a particular manner;

comparing the particular manner of the swiping, responsive to the detecting, to previously-defined settings that specify what manner of swiping indicates that the user is dynamically identifying a user-defined organizing criterion; and storing, if the comparing step determines that the particular manner is consistent with the defined settings, the swiped-across element in a repository of criteria, from which the stored element can subsequently be selected for inclusion in a pattern to be matched against electronic objects for programmatically organizing the electronic objects.

2. The method according to claim 1, further comprising the step of enabling the user to configure the defined settings.

3. The method according to claim 1, wherein the particular manner further comprises repeatedly swiping across a word, a phrase, or one or more contiguous characters in the rendered representation, and wherein the storing step stores the swiped-across word, phrase, or one or more contiguous characters as the stored element.

4. The method according to claim 3, wherein the words the phrase, or the characters is/are rendered from a test document.

5. The method according to claim 3, wherein the word, the phrase, or the characters is/are rendered from an e-mail message.

6. The method according to claim 1, wherein:

the particular manner further comprises swiping across a portion of an image in the rendered representation; and the storing step stores the swiped-across image portion as the element and further; and comprising the steps of:

including the stored image portion in a particular pattern to be matched against electronic objects; and using the particular pattern for programmatically organizing the electronic objects, further comprising the steps of:

evaluating content of each of the electronic objects with respect to the particular pattern; and including each of the compared objects in a category to which the particular pattern corresponds if the evaluating step determines that the content matches the particular pattern, including the image portion included therein.

7. The method according to claim 1, wherein the detected swiping further comprises swiping across one or more words, phrases, or characters in the rendered representation as the element.

8. The method according to claim 1, wherein the detected swiping further comprises swiping across a portion of one or more images in the rendered representation as the element.

9. The method according to claim 1, further comprising the step of building one or more rules, each rule specifying a pattern that comprises at least one organizing criteria to be matched against electronic objects for programmatically organizing the electronic objects, wherein the stored element is used as one of the organizing criteria in at least one of the rules.

10. The method according to claim 1, wherein the particular manner further comprises the user swiping across the element by moving a mouse device across the element at least twice.

11. The method according to claim 1, wherein the particular manner further comprises the user swiping across the element by moving a light pen device across the element at least twice.

12. The method according to claim 1, wherein the particular manner further comprises the user swiping across the element by moving his or her finger at least twice across the element, wherein the element is rendered on a plasma panel device.

13. The method according to claim 1, wherein the particular manner further comprises the user swiping across the element using an audio mechanism by speaking commands in the wanner specified in the previously-defined setting.

14. The method according to claim 1, wherein the particular manner further comprises the user swiping across the element using a video mechanism by passing his or her eyes repeatedly over the element.

15. The method according to claim 1, wherein the settings specify that the element of the rendered representation must be swiped across multiple times to indicate the identification.

16. The method according to claim 1, wherein the storing step further comprises adding the swiped-across element to organizing criteria of an index, thereby causing the index to become adaptive to the user swiping.

17. A system for indicating criteria for organizing electronic objects, comprising:
- a processor,
- means for detecting, by a user input monitor of the processor, that a user has swiped across an element of a rendered representation of an electronic object in a particular manner;
- means for comparing, by the processor, the particular manner of the swiping, responsive to the means for detecting, to previously-defined settings that specify what manner of swiping indicates that the user is dynamically identifying a user-defined organizing criterion;
- means for storing, if the means for comparing determines that the particular manner is consistent with the defined settings, the swiped element in a repository of criteria usable by the processor for programmatically organizing electronic objects; and
- means for enabling the stored element to be subsequently selected as an organizing criterion for use in a rule, wherein the rule can subsequently be used for programmatically organizing the electronic objects.

18. A computer program product for indicating criteria for organizing electronic objects, the computer program product embodied on one or more computer-readable media and comprising code that, when executed on a computer, causes the computer to:
- detect, by a user input monitor, that a user has swiped across an element of a rendered representation of an electronic object in a particular manner;
- compare the particular manner of responsive to the detection, to previously-defined settings that specify what manner of swiping indicates that the user is dynamically identifying a user-defined criterion;
- store, if the comparison determines that the particular manner is consistent with the defined settings, the swiped element in a repository of criteria usable for programmatically organizing electronic objects; and
- enable the stored element to be used as an organizing criterion in a rule, wherein the rule can subsequently be used for programmatically organizing the electronic objects.

* * * * *